E. G. MATTHEWS.
Plow.
No. 224,455.  Patented Feb. 10, 1880.
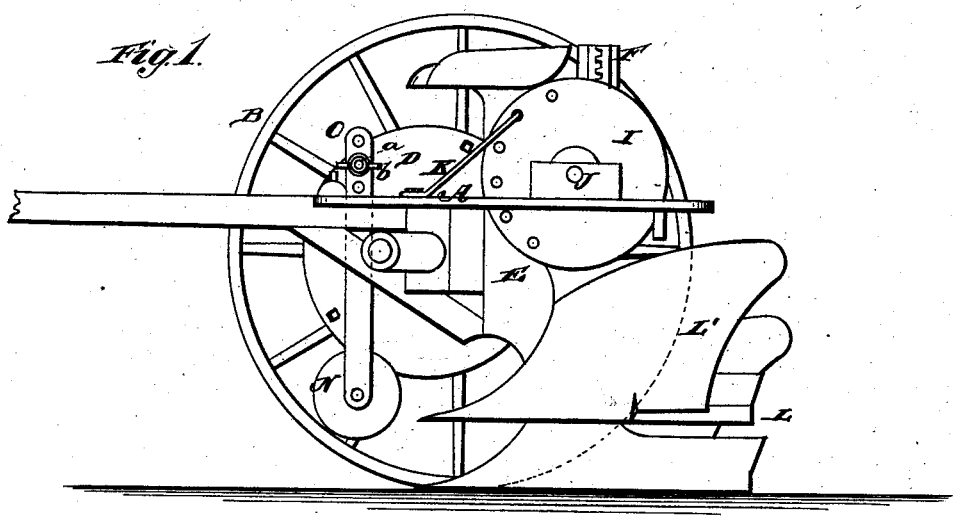
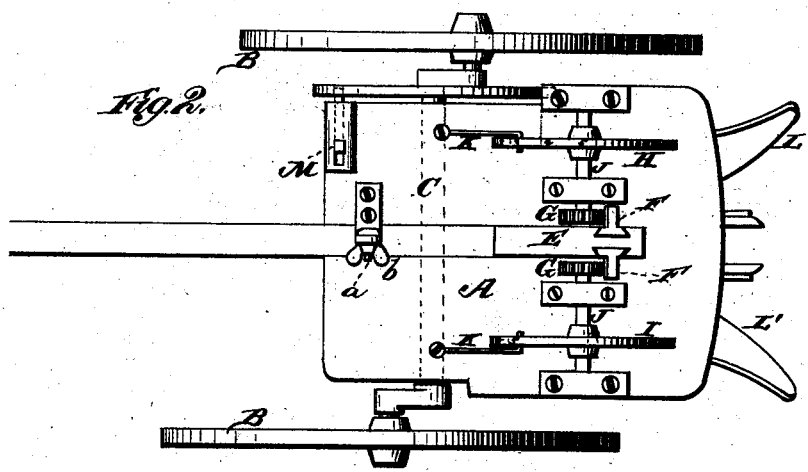
WITNESSES
Robert Courts
H. Clay Smith
INVENTOR
Elbridge G. Matthews
By Gilmore, Smith & Co.
ATTORNEYS.

UNITED STATES PATENT OFFICE.

ELBRIDGE G. MATTHEWS, OF LE SAUK, MINNESOTA.

PLOW.

SPECIFICATION forming part of Letters Patent No. 224,455, dated February 10, 1880.

Application filed March 1, 1879.

*To all whom it may concern:*

Be it known that I, ELBRIDGE G. MATTHEWS, of Le Sauk, in the county of Stearns and State of Minnesota, have invented certain new and useful Improvements in Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 of the drawings is a representation of a side elevation of my plow, and Fig. 2 is a plan view of the same.

This invention has relation to plows; and it consists in the improvements in the construction of the same hereinafter fully described, and particularly pointed out in the claims.

In carrying out my invention I mount the plow-frame upon suitable riding-wheels, both of which are secured to a crank-axle so that they may be adjusted either to ride in the furrow or upon the unturned land, as may be required in operating the plow. I also provide two plows, one of which is a right-hand and the other a left-hand plow, and these I operate with racks and pinions, so that they may be raised and lowered alternately at will, for the purpose of causing the furrows to always be turned in one direction by simply traversing the field back and forth.

To hold the plows in the proper positions I provide perforated disks upon the shaft which carries the pinions that operate the racks carrying the plows, and also secure to the frame, by pivoting or otherwise, hooked arms, the hooks of which are made to enter the perforations in the disks to prevent them from revolving after the plows have been adjusted. I provide one crank end of the axle with a perforated disk, also into which a sliding arm or bolt enters to hold the axle at the proper adjustment. A vertically-adjustable guide-wheel works in front of the plows. Its adjustment is effected through perforations in its shank and a screw and nut which clamp it against an arm upon the upper face of the platform.

Referring to the drawings, A designates the platform; B, the supporting-wheels, and C the crank-axle, carrying the adjusting-disk D. A vertical block, E, is provided with ways in which the adjusting-racks F work. The teeth of pinions G G, one on each side of the block E, engage with the teeth of the racks F. Perforated disks H I are secured to the shafts J J, on which the pinions G are fixed, and stay-rods K, provided with hooks, are used to hold the plows L L' at any position to which they may be adjusted by inserting the hooks on said rods into the perforations in the disks H I.

A sliding arm, M, is employed to enter the perforations in the disk D, to hold the crank-axle C to its adjustment.

The guide-wheel N has a perforated shank, O, the latter being made vertically adjustable through the screw $a$, thumb-nut $b$, and arm P on the platform A. The block E is extended forward and a driver's seat is mounted thereon.

The plows L L' are right and left plows, and are to be alternately adjusted, so that the field may be traversed back and forth and the furrows turned all in the same direction.

The crank-axle C is to be adjusted through its disk D, to keep the axle itself even, either when the wheel thereto attached is in the furrow or upon the unturned land.

I claim—

1. In a plow, the combination of the crank-axle C, having the perforated disk D, with the sliding arm M, substantially as and for the purposes set forth.

2. In a plow, the crank-axle C, having the perforated disk D, with the sliding arm M, in combination with the plows L L', secured to the racks F, working in ways in the block E, and the pinions G G upon the shaft J, carrying the perforated disks H I, and the hooked rods K, substantially as and for the purposes set forth.

In testimony that I claim the foregoing as my own I affix my signature in presence of two witnesses.

ELBRIDGE G. MATTHEWS.

Witnesses:
OSCAR TAYLOR,
JOSEPH B. SARTELL.